United States Patent
Aymes

(10) Patent No.: US 9,709,658 B2
(45) Date of Patent: Jul. 18, 2017

(54) METHOD AND SYSTEM FOR MONITORING A PHASE FOR TRANSFERRING A SATELLITE FROM AN INITIAL ORBIT TO A MISSION ORBIT

(71) Applicant: AIRBUS DEFENCE AND SPACE SAS, Les Mureaux (FR)

(72) Inventor: Jean-Marc Aymes, Saint Orens de Gameville (FR)

(73) Assignee: Airbus Defence and Space SAS, Les Mureaux (FR)

( * ) Notice: Subject to any disclaimer, the term of this patent is extended or adjusted under 35 U.S.C. 154(b) by 0 days.

(21) Appl. No.: 14/392,193

(22) PCT Filed: Jun. 24, 2014

(86) PCT No.: PCT/EP2014/063282
§ 371 (c)(1),
(2) Date: Dec. 23, 2015

(87) PCT Pub. No.: WO2014/206984
PCT Pub. Date: Dec. 31, 2014

(65) Prior Publication Data
US 2016/0131737 A1    May 12, 2016

(30) Foreign Application Priority Data
Jun. 24, 2013   (FR) ...................................... 13 55981

(51) Int. Cl.
*G01S 3/48*       (2006.01)
*B64G 3/00*      (2006.01)
(Continued)

(52) U.S. Cl.
CPC .................. *G01S 3/48* (2013.01); *B64G 3/00* (2013.01); *G01S 5/02* (2013.01); *G01S 5/0294* (2013.01); *B64G 1/007* (2013.01); *B64G 1/405* (2013.01)

(58) Field of Classification Search
CPC .............. G01S 3/48; H01Q 3/267; B04G 3/00
See application file for complete search history.

(56) References Cited

U.S. PATENT DOCUMENTS

| 3,553,697 | A |   | 1/1971 | Kaufman et al. |       |
|-----------|---|---|--------|----------------|-------|
| 4,385,301 | A | * | 5/1983 | Tricoles ..................... | G01S 5/02 342/445 |

(Continued)

FOREIGN PATENT DOCUMENTS

EP    1 059 232 A2    12/2000

OTHER PUBLICATIONS

Slope. (2011). The American Heritage Dictionary of the English Language. Boston, MA: Houghton Mifflin. Retrieved from http://search.credoreference.com/content/entry/hmdictenglang/slope/0.*

(Continued)

*Primary Examiner* — Bernarr Gregory
*Assistant Examiner* — Fred H Mull
(74) *Attorney, Agent, or Firm* — Young & Thompson

(57) ABSTRACT

Disclosed is a method (70) for monitoring a phase for transferring a satellite (20) from one earth orbit, called "initial orbit", to another earth orbit, called "mission orbit", in particular a transfer using electric propulsion unit. The monitoring method includes a step for estimating the direction of the satellite during the transfer phase by way of an earth array antenna (30) including a plurality of elementary antennas (31), each elementary antenna having a primary radiation lobe with a width greater than or equal to 20°, the elementary antennas (31) being oriented such that their (Continued)

respective fields of vision overlap, the direction of the satellite being estimated based on at least one useful phase difference measurement between signals corresponding to a target signal, transmitted by the satellite and received on a pair of elementary antennas (31).

19 Claims, 2 Drawing Sheets

(51) Int. Cl.
  *G01S 5/02* (2010.01)
  *B64G 1/40* (2006.01)
  *B64G 1/00* (2006.01)

(56) References Cited

U.S. PATENT DOCUMENTS

| | | | | |
|---|---|---|---|---|
| 4,754,280 A * | 6/1988 | Brown | ............... | G01S 19/54 342/357.59 |
| 5,778,324 A * | 7/1998 | Smith | ............... | H01Q 25/00 343/892 |
| 6,058,318 A * | 5/2000 | Kobayakawa | ......... | H01Q 3/267 375/226 |
| 6,212,406 B1 * | 4/2001 | Keskitalo | ............... | H04B 7/10 455/277.1 |
| 6,594,509 B1 * | 7/2003 | Takakusaki | ............ | H01Q 1/246 342/174 |
| 2001/0016505 A1 * | 8/2001 | Rexberg | ............... | H01Q 3/267 455/562.1 |
| 2002/0137547 A1 * | 9/2002 | Judson | ............... | H01Q 1/246 455/562.1 |
| 2003/0186725 A1 * | 10/2003 | Miya | ............... | H01Q 3/267 455/561 |
| 2006/0071866 A1 * | 4/2006 | Andersson | ............... | G01S 3/04 343/705 |
| 2008/0107155 A1 * | 5/2008 | Kennedy, Jr. | ............ | H04B 1/713 375/133 |
| 2009/0289863 A1 * | 11/2009 | Lier | ............... | H01Q 1/288 343/753 |
| 2010/0056059 A1 * | 3/2010 | Lakshmanan | ........ | H04B 7/0452 455/63.1 |
| 2011/0208481 A1 * | 8/2011 | Slastion | ............... | G01S 3/74 702/189 |
| 2012/0212371 A1 * | 8/2012 | Chang | ............... | H01Q 3/2605 342/373 |
| 2013/0229262 A1 * | 9/2013 | Bellows | ............... | H01Q 1/007 340/10.1 |

OTHER PUBLICATIONS

International Search Report, dated Sep. 12, 2014, from corresponding PCT application.

* cited by examiner

METHOD AND SYSTEM FOR MONITORING A PHASE FOR TRANSFERRING A SATELLITE FROM AN INITIAL ORBIT TO A MISSION ORBIT

TECHNICAL FIELD

The field of the present invention is that of observation of satellites in Earth orbit. The present invention more particularly concerns a system and a method for monitoring a phase for transferring a satellite from one Earth orbit, called the "initial orbit", to another Earth orbit, called the "mission orbit". The purpose of this monitoring is notably to generate azimuth and elevation measurements in order to determine the orbit of the satellite during the transfer phase.

The present invention finds a particularly advantageous, although non-limiting, application for monitoring the stationing of satellites in geostationary orbit (GEO) from a geostationary transfer orbit (GTO), in particular when stationing is effected by electric propulsion means of the satellite or a spacecraft transporting said satellite from the GTO orbit to the GEO orbit.

PRIOR ART

Telemetry, tracking and command (TT&C) Earth stations are generally employed to monitor the phase for transferring a satellite from an initial orbit, into which said satellite was injected by a launch vehicle, to a GEO orbit.

Such TT&C stations comprise an antenna that is highly directional in order to ensure a sufficient level of reception to decode a TT&C signal transmitted by the satellite during the transfer phase and mobile in order to track the movement of said satellite during the transfer phase.

The use of TT&C stations is very costly, and so the time for which a TT&C station is rented is preferably minimized.

However, in the case of stationing in GEO orbit using electric propulsion means, the transfer takes approximately 3 months (in the case of stationing using hybrid electrical/chemical production means) and approximately 6 months (in the case of stationing using exclusively electric propulsion means).

The costs of renting TT&C stations for such periods (3 to 6 months) are prohibitive. Moreover, if stationing in GEO orbit by electric propulsion means continues to expand, the existing networks of TT&C stations will rapidly by outdistanced by the demand.

An alternative would be to use the TT&C stations to monitor the transfer phase of the satellite only occasionally. In such a case, the intended trajectory of said satellite would be used to estimate the direction of the satellite at the time of using a TT&C station, in order to direct the antenna of said TT&C station in the intended direction.

However, if the satellite is not located in the intended direction, for example because of a failure of the electric propulsion means, said satellite will be lost and possibly relocated only by effecting a long and costly scan of space by means of one or more TT&C stations.

SUMMARY OF THE INVENTION

An objective of the present invention is to remedy some or all of the limitations of the prior art solutions, notably those explained above, by proposing a solution that makes it possible to monitor the stationing of a satellite in orbit at lower cost and without risk of losing the satellite.

To this end, and in accordance with a first aspect, the invention concerns a method for monitoring a phase for transferring a satellite from one Earth orbit, called the "initial orbit", to another Earth orbit, called the "mission orbit", in particular a transfer using electric propulsion means. According to the invention, the method comprises a step for estimating the direction of the satellite by means of a ground array antenna comprising a plurality of elementary antennas, each elementary antenna having a main radiation lobe with a width greater than or equal to 20°, said elementary antennas being oriented such that their respective fields of vision overlap, the position of said satellite being estimated based on at least one measurement of a phase difference, called the "useful phase difference", between signals corresponding to a target signal, transmitted by said satellite during the transfer phase, and received on a pair of elementary antennas of the array antenna.

Such an array antenna, made up of elementary antennas that are not very directional, can simultaneously cover a wide field of vision, and can therefore be used to monitor simultaneously a plurality of satellites within the same large solid angle and/or to search for the satellite in a large solid angle without having to move the array antenna.

In particular embodiments, the method may have one or more of the following features, separately or in all technically possible combinations.

In particular embodiments, the elementary antennas of the array antenna are not coplanar.

In particular embodiments, a receive antenna, called the "directional antenna", having a maximum gain greater than the respective maximum gains of each of the elementary antennas of the array antenna is directed in the direction of the satellite, estimated by means of the array antenna, to receive the target signal transmitted by said satellite.

In particular embodiments, if a plurality of possible directions of the satellite are estimated by means of the array antenna, the directional antenna is directed in each possible direction to determine the real direction of said satellite.

In one particular embodiment, the method comprises:
the transmission, by a reference calibration transmitter immobile relative to the array antenna, of a reference calibration signal to the array antenna,
the measurement of a phase difference, called the "calibration phase difference", between signals corresponding to the reference calibration signal received on the pair of elementary antennas,
the compensation of the variations of the calibration phase difference measurements for the pair of elementary antennas on the useful phase difference measurements.

In a known manner, the receive subsystems of each elementary antenna can introduce differential phase skews, which can be calibrated during the manufacture of the array antenna. The phase instabilities of said receive subsystems can nevertheless cause these differential phase skews to vary over time, so that the initial calibration may become insufficient if said variations are large.

Thanks to the transmission and the processing of the reference calibration signal, it is possible to estimate continuously the variations of the differential phase skew and to compensate them on the useful phase difference measurements. As a result, the constraints in terms of phase stability of the receive subsystems of each elementary antenna can be loosened, and so they can be equipped with less costly components.

In one particular embodiment, the reference calibration signal is transmitted during an interval of acquisition of the signals corresponding to the target signal received on the pair of elementary antennas, and the measurement of the useful phase difference for said pair of elementary antennas comprises a correlation of said acquired signals with one another throughout the acquisition interval, a plurality of calibration phase difference measurements being effected, during said acquisition interval, to compensate the variations of the calibration phase difference measurements on the acquired signals.

Such arrangements make it possible to improve the signal to noise ratio of the target signal. In effect, because the elementary antennas are not very directional, it may prove necessary to increase the time of observation of the target signal to be able to detect it and where applicable to decode it. By observing the signals received over longer acquisition intervals, the differential phase skews introduced by the phase instabilities of the receive subsystems can vary significantly during the acquisition intervals, including in receive subsystems equipped with stable and costly components.

It is therefore advantageous to effect a plurality of calibration phase difference measurements in order to correct the differential phase skew variations induced by the phase instabilities of the receive subsystems continuously throughout an acquisition interval.

In one particular embodiment, the calibration phase difference measurement for the pair of elementary antennas comprises either the correlation of the signals received on said pair of elementary antennas with the reference calibration signal transmitted or the analysis of said received signals by means of an FFT or a PLL.

Such arrangements make it possible to improve the signal to noise ratio of the reference calibration signal received.

In one particular embodiment, the method comprises a step of geometric calibration of the array antenna, during which the geometry of the array antenna is estimated based on measurements of the phase difference between signals corresponding to geometric calibration signals transmitted by geometric calibration transmitters and received on the array antenna, and based on the positions of said geometric calibration transmitters and the position of the array antenna.

In one particular embodiment, the signals corresponding to some or all of the geometric calibration signals received on the array antenna are acquired sequentially during distinct acquisition intervals, said method comprising, for the acquisition of a geometric calibration signal, a step of commanding the reference calibration transmitter to transpose the frequency of the reference calibration signal into a frequency band for acquisition of said geometric calibration signal, the variations of the calibration phase difference measurements being compensated on the measurements of the phase difference between said signals corresponding to said geometric calibration signal.

Such arrangements make it possible to effect the geometric calibration of the array antenna based on geometric calibration signals that can be widely spaced in frequency, using narrow acquisition frequency bands. In effect, an appropriate specific acquisition frequency band can be used for each geometric calibration signal in which the reference calibration transmitter also transmits the reference calibration signal in order to make it possible to correct if necessary the phase instabilities of the receive subsystems for each geometric calibration signal.

In accordance with a second aspect, the invention concerns a system for monitoring a phase for transferring a satellite from one Earth orbit, called the "initial orbit", to another Earth orbit, called the "mission orbit", in particular a transfer using electric propulsion means. In accordance with the invention, the system comprises:

- a ground array antenna comprising a plurality of elementary antennas, each elementary antenna having a main radiation lobe with a width greater than or equal to 20°, said elementary antennas being oriented so that their respective fields of vision overlap,
- means adapted to estimate the direction of the satellite during said transfer phase based on at least one measurement of the phase difference, called the "useful phase difference", between signals corresponding to a target signal, transmitted by said satellite during the transfer phase, and received on a pair of elementary antennas of the array antenna.

In particular embodiments, the system may further comprise one or more of the following features, separately or in all technically possible combinations.

In particular embodiments, the elementary antennas of the array antenna are not coplanar.

In particular embodiments, the monitoring system comprises a receive antenna, called the "directional antenna", having a maximum gain greater than the respective maximum gains of each of the elementary antennas of the array antenna.

In one particular embodiment, the elementary antennas of the array antenna are joined together and attached to the same support structure.

Such arrangements make it possible to limit the phase instabilities induced by the geometry of the array antenna. The array antenna, in one piece and mechanically rigid because of the support structure, is moreover easy to install and to move.

In one particular embodiment, the maximum distance between elementary antennas of the array antenna is equal to or less than $50 \cdot \lambda_{MAX}$, $\lambda_{MAX}$ corresponding to the maximum wavelength of the signals to be acquired by means of said array antenna.

Such arrangements make it possible to obtain an array antenna that is easy to move and to limit the ambiguities in the phase difference measurements.

In one particular embodiment, the minimum distance between elementary antennas is equal to or greater than $5 \sim \lambda_{MAX}$.

Such arrangements make it possible to ensure good accuracy in the estimation of the direction of the satellite.

In one particular embodiment, the system comprises:

- a reference calibration transmitter immobile relative to the array antenna, said reference calibration transmitter being adapted to transmit a reference calibration signal to the array antenna,
- means adapted to measure a phase difference, called the "calibration phase difference", between signals corresponding to the reference calibration signal received on the pair of elementary antennas,
- means adapted to compensate the variations of the calibration phase difference measurements for the pair of elementary antennas on the useful phase difference measurements.

In one particular embodiment, the system comprises means adapted to command the reference calibration transmitter to transpose the frequency of the reference calibration signal.

In one particular embodiment, the means adapted to measure the calibration phase difference are configured to effect either a correlation of the signals received on said pair of elementary antennas with the reference calibration signal transmitted or an analysis of said received signals by means of an FFT or a PLL.

In one particular embodiment, the reference calibration transmitter is a ground transmitter or a transmitter onboard a satellite in geostationary orbit.

In one particular embodiment, the system comprises means adapted to calibrate the array antenna geometrically based on measurements of the phase difference between signals corresponding to geometric calibration signals transmitted by geometric calibration transmitters and received on the array antenna and based on the positions of said geometric calibration transmitters.

In one particular embodiment, at least one geometric calibration transmitter is a transmitter onboard a satellite in geostationary orbit or a satellite in non-geostationary orbit, preferably a satellite of a global navigation satellite system (GNSS) or a ground transmitter.

DESCRIPTION OF THE FIGURES

The invention will be better understood on reading the following description, given by way of nonlimiting example and with reference to the figures, which show.

In these figures, references identical from one figure to another designate identical or similar elements. For reasons of clarity, the elements represented are not represented to scale, unless otherwise indicated.

DETAILED DESCRIPTION OF EMBODIMENTS

The present invention concerns a system 10 and a method 70 for monitoring a phase for transferring a satellite 20 from one Earth orbit, called the "initial orbit", to another Earth orbit, called the "mission orbit". In the remainder of the description, without this limiting the invention, the mission orbit is the GEO orbit and the initial orbit is a GTO orbit in which the satellite 20 is stationed using launch means such as a conventional launch vehicle from the Ariane 5 range.

Transferring a satellite 20 to a GEO orbit from a GTO orbit conventionally uses propulsion means of said satellite 20 and/or propulsion means of a transporter vehicle transporting said satellite over at least a part of the path between the GTO orbit and the GEO orbit.

The invention finds a particularly advantageous application in the case of use of electric propulsion means over all or part of the path between the GTO orbit and the GEO orbit. In effect, as indicated above, the duration of the transfer is then long (3 to 6 months), with the result that the rental of TT&C stations throughout the duration of the transfer represents too high a cost, and also constitutes inefficient use of the TT&C stations.

However, there is nothing to rule out using the invention to monitor a phase of transferring a satellite using non-electric propulsion means, in particular chemical propulsion means.

Figure 1:
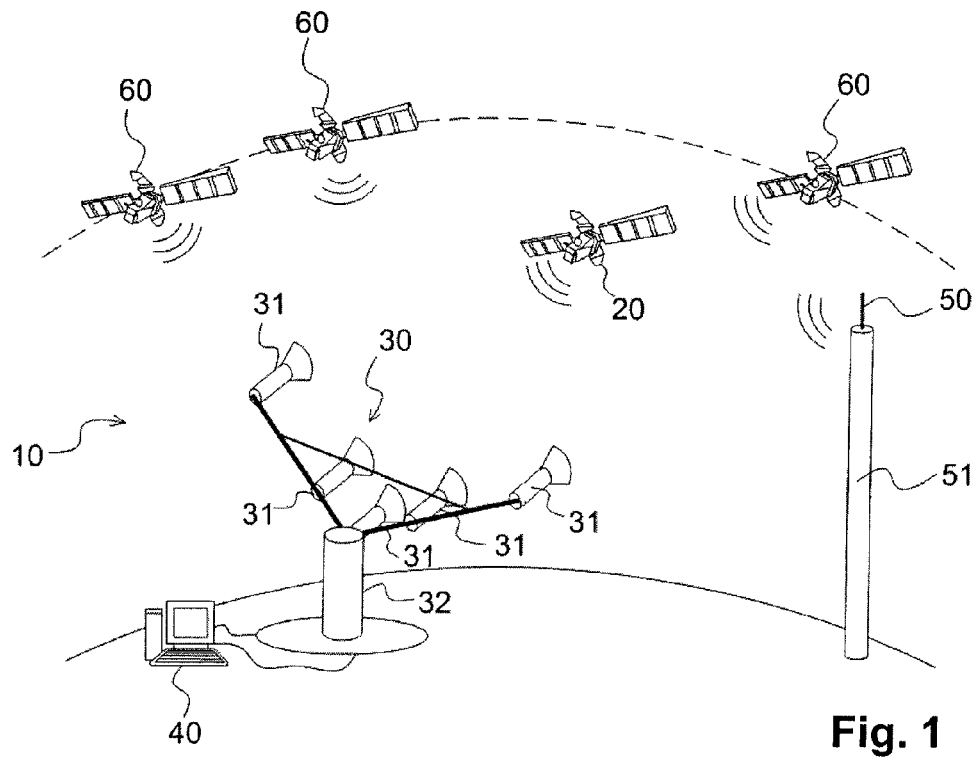
FIG. 1: a diagrammatic representation of one embodiment of a system for monitoring a phase of transferring a satellite.

FIG. 1 represents diagrammatically one embodiment of a system 10 for monitoring a phase of transferring a satellite 20 from a GTO orbit to the GEO orbit.

As shown in FIG. 1, the monitoring system 10 comprises a ground array antenna 30. By "ground" is meant on the surface of the Earth, notably on the ground itself, on the roof of a building, on a pylon, etc.

The array antenna 30 comprises a plurality of elementary antennas 31. Each elementary antenna 31 has a main radiation lobe with a width equal to or greater than 20°. By "main radiation lobe" is meant the lobe of the radiation diagram of the elementary antenna comprising the main radiation direction, i.e. the radiation direction for which the maximum gain $G_{MAX}$ of the elementary antenna is obtained. The width of the main radiation lobe corresponds to the minimum width of the angular range comprising the main radiation direction and radiation directions having a gain equal to or greater than $(G_{MAX}-3$ dB), regardless of the plane in question comprising said main radiation direction of the elementary antenna.

Moreover, the elementary antennas 31 are oriented so that their respective fields of vision overlap at least partly, i.e. so that there is a field of vision common to all of said elementary antennas 31. Said elementary antennas 31 are preferably oriented so that their respective fields of vision substantially coincide, i.e. so that the common field of vision substantially corresponds to the field of vision of each elementary antenna 31.

Because the elementary antennas 31 are not very directional, the array antenna 30 can simultaneously cover a wide field of vision, 20° wide or wider. In preferred embodiments, each elementary antenna 31 advantageously has an even wider main radiation lobe, for example 40° wide or wider, or even 60° wide or wider. For example, a field of vision of the order of 50° corresponds to a good compromise between the width of said field of vision and the gain in the main radiation direction.

The monitoring system 10 also comprises a processor device 40 connected to each of the elementary antennas 31 of the array antenna 30 by respective receive subsystems (not shown in the figures).

Each receive subsystem conventionally comprises at least one low-noise amplifier (LNA), a frequency reducer circuit and an analog/digital converter. The analog/digital converters of the various receive subsystems are preferably synchronized in time, in order to ensure the temporal consistency of the signals coming from the elementary antennas 31 and processed by the processor device 40. Moreover, the frequency reducer circuits are preferably slaved to the same reference frequency, for example supplied by the same local oscillator to all of the receive subsystems. As a result, the differential frequency and phase drifts specific to the receive subsystems are limited.

The processor device 40 is adapted to process the signals received by the various elementary antennas 31 of the array antenna.

The processor device 40 comprises for example at least one processor and at least one electronic memory in which is stored a computer program product in the form of a set of program code instructions to be executed to implement the various steps of a monitoring method 70. In one variant, the processor device 40 also comprises one or more programmable logic circuits, of FPGA, PLD, etc type, and/or application-specific integrated circuits (ASIC) adapted to implement some or all of said steps of the monitoring method 70.

In other words, the processor device 40 comprises a set of software means (dedicated computer program product) and/or hardware means (FPGA, PLD, ASIC, etc.) configured to implement the various steps of a monitoring method 70 described hereinafter.

In particular, a monitoring method 70 in accordance with the invention comprises a step of estimating the direction of the satellite 20 during the transfer phase based on at least one measurement of the phase difference, called the "useful phase difference", between signals corresponding to a target signal transmitted by said satellite 20 during the transfer phase and received on a pair of elementary antennas 31 of the array antenna 30.

The direction of the satellite 20 is estimated based on one more useful phase difference measurements using means considered to be known to the person skilled in the art.

For example, a useful phase difference measurement for a pair of elementary antennas makes it possible to determine a path difference between paths taken by the target signal to arrive at each of said elementary antennas 31. This path difference can in turn be used to estimate the direction of arrival of the target signal relative to said pair of elementary antennas 31, which corresponds to the direction of the satellite 20 relative to said pair of elementary antennas 31. It should be noted that the path difference estimated by means of a useful phase difference measurement may prove ambiguous in that the phase is estimated modulo $2\pi$. However, this ambiguity can be resolved by means that are outside the scope of the invention and are considered to be known to the person skilled in the art. In accordance with a nonlimiting example, the useful phase difference measurements are effected recurrently so as to obtain unambiguous measurements of the variation of the useful phase difference ensuring, based on a predefined knowledge of the maximum rate of variation of the path difference, that the maximum variation of the path difference between two successive measurements corresponds to a useful phase difference less than $\pi$. Such measurements of the variation of the useful phase difference can be used to estimate the variation of the path difference of the target signal transmitted by the satellite 20. The path difference at a time t1 can therefore be estimated as soon as an estimate of the path difference at a time t0 (possibly supplied by other means) and an estimate of the variation of the path difference between the times t0 and t1 are available.

The direction of arrival of the target signal relative to the pair of elementary antennas 31 can also be estimated using more complex algorithms. There may be cited by way of nonlimiting example the MUSIC algorithm (see for example: "Multiple Emitter Location and Signal Parameter Estimation", R. O. Schmidt, IEEE Transactions on Antennas and Propagation, Vol. 34, No. 3, March 1986). The MUSIC algorithm is in effect based on calculations of correlation matrices between the signals received on the various elementary antennas 31 and the phase of the result of the correlation between the signals received on a pair of elementary antennas 31 corresponds to the useful phase difference between those signals.

In the remainder of the description, the nonlimiting situation is that of the direction of the satellite 20 being estimated based on an estimate of the path difference.

It should be noted that, considering a single pair of elementary antennas for measuring the useful phase difference, it is possible only to estimate a 2D direction of the satellite 20, in a plane passing through said satellite 20 and said pair of elementary antennas 31. Depending on the applications envisaged, the estimation of a 2D direction may suffice, with the result that the array antenna 30 must comprise at least one pair of elementary antennas 31.

To estimate the 3D direction (in azimuth and elevation) of the satellite 20 in a frame of reference associated with the array antenna 30, it is necessary to have available at least two useful phase difference measurements for two distinct pairs consisting of at least three elementary antennas 31 not all of which are aligned.

In the nonlimiting example illustrated by FIG. 1, the array antenna 30 comprises five elementary antennas 31 arranged in a plane along two non-orthogonal axes. Such a configuration of the array antenna 30 can therefore be used to estimate the 3D direction of the satellite 20. Moreover, it is possible to consider using more than two distinct pairs of elementary antennas 31 in order to improve accuracy and/or to resolve some or all of the ambiguities in the estimate of the path difference.

Figure 2:
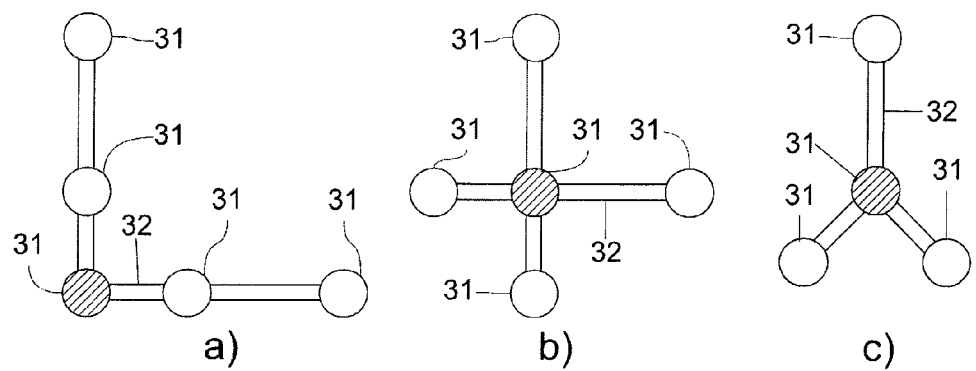
FIG. 2: diagrammatic representations of embodiments of array antennas.

FIG. 2 represents diagrammatically nonlimiting embodiments of the array antenna 30. The part a) of FIG. 2 represents a different view of the array antenna 30 from FIG. 1. The part b) of FIG. 2 represents a more compact variant embodiment of the array antenna 30 of the part a) of FIG. 2. The part c) of FIG. 2 represents a nonlimiting embodiment of an array antenna 30 comprising four elementary antennas 31. As shown in the embodiments illustrated by FIG. 2, the distance between adjacent elementary antennas 31 can advantageously be different for all the pairs of adjacent elementary antennas 31 of the array antenna 30, in order to improve the resolving of ambiguity in the estimate of the direction of the satellite 20.

In preferred embodiments of the monitoring system 10, the elementary antennas 31 of the array antenna 30 are not all coplanar. In other words, the phase centers of said elementary antennas 31 are not all in the same plane.

Such arrangements make it possible to improve the resolving of ambiguity in the estimate of the direction of the satellite 20. In effect, considering an array antenna 30 the elementary antennas 31 of which are not all coplanar, the geometry of the zones of ambiguity is going to depend on the direction of arrival of the target signal relative to said array antenna 30. Because of the mobility of the satellite 20, the direction of arrival of the target signal relative to said array antenna 30, and therefore likewise the geometry of the zones of ambiguity, is going to vary over time. Because of the very existence of the zones of ambiguity, several positions are possible for the satellite 20 at any time. By estimating successively the various possible positions, it will be possible to identify a plurality of possible trajectories for the satellite 20 over time. Thanks to the variations of the geometry of the zones of ambiguity introduced by the non-planar geometry of the array antenna 30, any trajectories associated with erroneous positions of the satellite 20 are going to tend to disappear from the set of likely solutions determined by computation. Consequently, over a sufficiently long time interval, it will be possible to eliminate the trajectories associated with erroneous positions of the satellite 20 and to retain only the trajectory associated with the real successive positions of said satellite 20 over time.

Figure 3:
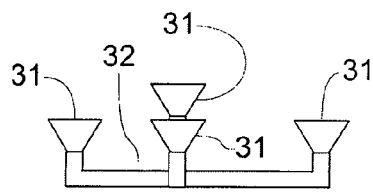
FIG. 3: a diagrammatic representation of an array antenna in accordance with a preferred embodiment of the invention.

For example, it is possible to advance one of the elementary antennas 31 relative to the other elementary antennas 31, the phase centers of which are coplanar. In the nonlimiting embodiments illustrated by FIG. 2, it is for example possible to advance the center elementary antenna 31 (cross-hatched in FIG. 2) relative to the other elementary antennas 31. The distance between the center elementary antenna 31 and the plane in which the other elementary antennas 31 of the array antenna 30 are situated must make it possible to resolve the ambiguities without the risk of introducing masking by the center elementary antenna 31. The term "reference distance" refers to the minimum distance measured in the plane between the center elementary antenna 31 and each of the adjacent elementary antennas 31. By "measured in the plane" is meant that the reference distance is determined considering the distance between the orthogonal projection of the center elementary antenna 31 onto said plane and each of the adjacent elementary antennas 31 in said plane. To avoid masking phenomena, the distance between the center elementary antenna 31 and the plane in which the other elementary antennas 31 are situated is less than said reference distance, for example. The distance between the center elementary antenna 31 and the plane in which the other elementary antennas 31 are situated must not be too small if it is to be possible to resolve the ambiguities. A suitable value of this distance can be determined by simulation or by tests carried out by the person skilled in the art. For example, a value of 0.5 times the reference distance makes it possible both to avoid masking phenomena and to resolve the ambiguities for an array antenna 30 having a field of vision 40° wide or wider. By way of nonlimiting example, FIG. 3 represents a side view of the array antenna 30 represented in part b) of FIG. 2 in the situation where the center elementary antenna 31 is advanced relative to the other elementary antennas 31, the phase centers of which are coplanar.

In the nonlimiting examples illustrated by FIGS. 1 and 2, the elementary antennas 31 of the array antenna 30 are advantageously joined together and attached to the same support structure 32. As a result, the geometry of the array antenna 30 is stable over time to the degree that a movement of one of the elementary antennas 31 is also transmitted identically to the other elementary antennas 31.

In other examples, there is nothing to rule out using elementary antennas 31 that are not joined together, for example supported by respective distinct support structures. In such a case, the geometry of the array antenna 30 is less stable over time, however.

It should be noted that the accuracy of the estimate of the direction of the satellite 20 based on a useful phase difference measurement for a pair of elementary antennas 31 increases with the distance between said elementary antennas 31 of the pair concerned. In order to obtain an accuracy compatible with monitoring the transfer phase of the satellite 20, the distance between said elementary antennas 31 of the pair concerned must be very much greater than the wavelength of the target signal, for example at least 10 times greater than the wavelength of the target signal.

In the situation where different wavelengths are possible, then it is necessary to consider the maximum wavelength $\lambda_{MAX}$ of the signals to be acquired by means of the array antenna 30. The elementary antennas 31 of each pair considered for estimating the direction of the satellite 20 are preferably at least $5 \cdot \lambda_{MAX}$ or even at least $10 \cdot \lambda_{MAX}$ apart.

In preferred embodiments the distance between the two elementary antennas 31 of the array antenna 30 that are farthest apart is equal to or less than $50 \cdot \lambda_{MAX}$. Such an array antenna 30, in particular one in which the elementary antennas 31 are fixed to the same support structure 32, is compact and easy to move. Moreover, such an array antenna 30 makes it possible to limit the ambiguities in respect of the useful phase difference.

In the case of a target signal with a minimum frequency of 11.7 GHz, the maximum wavelength $\lambda_{MAX}$ is equal to 2.56 cm. In such a case the array antenna 30 is preferably configured so that:
  the maximum distance between elementary antennas 31 of said array antenna is equal to or less than 128 cm;
  the minimum distance between elementary antennas 31 of said array antenna is equal to or greater than 25.6 cm.

Figure 4:
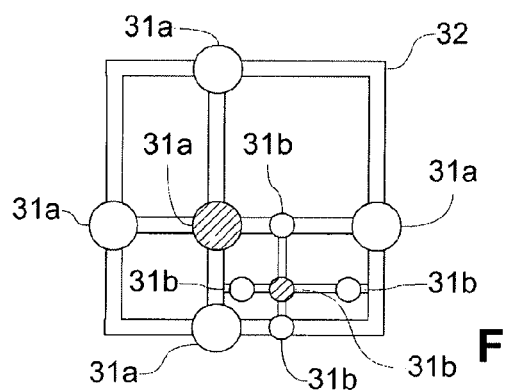
FIG. 4: a diagrammatic representation of an array antenna in accordance with another preferred embodiment of the invention.

FIG. 4 represents diagrammatically an embodiment of an array antenna 30 adapted to operate in two distinct frequency bands, for example band C (between 4 GHz and 8 GHz) and the Ku band (between 12 GHz and 18 GHz). To this end the array antenna 30 shown comprises two sub-arrays of elementary antennas:
  a first sub-array of elementary antennas 31a optimized for the reception of signals in a first frequency band (for example band C);
  a second sub-array of elementary antennas 31b optimized for the reception of signals in a second frequency band (for example the Ku band).

In the nonlimiting example illustrated by FIG. 4, the first sub-array and the second sub-array are both arranged in accordance with the example illustrated by part b) of FIG. 2. In preferred embodiments, the centre elementary antennas 31a, 31b (cross-hatched in FIG. 4) of the first sub-array and the second sub-array are, advanced relative to the other elementary antennas 31a, 31b, so that the elementary antennas 31a, 31b of each sub-array are not all coplanar. Moreover, in the nonlimiting example illustrated by FIG. 4, the elementary antennas 31a, 31b of the first sub-array and of the second sub-array are all supported by the same support structure 32.

As indicated above, the array antenna 30 has a wide field of vision, 20° wide or wider, or even 40° wide or wider, and consequently can be used to monitor simultaneously a plurality of satellites in the same large solid angle and/or to search for the satellite in a large solid angle without having to move the array antenna.

Because the elementary antennas 31 are not very directional, the antenna gain will be less than that of the antennas of current TT&C stations. However, the reduction of the antenna gain can be compensated by observing signals received over acquisition intervals that are sufficiently long to be able at least to detect the target signal. Such observation of the signals received over longer acquisition intervals does not necessarily make it possible to decode the target signal if the latter carries data (for example a TT&C signal, here the telemetry signal transmitted by the satellite 20, the control signal being transmitted by the TT&C station), in particular if the duration of the data symbols is less than the duration of the acquisition intervals. The choice of a suitable duration of the acquisition intervals based on the gain of the elementary antennas 31 and the signal to noise ratio necessary for detecting and where applicable decoding the target signal is considered to be evident to the person skilled in the art.

The array antenna 30 is primarily employed to detect and to estimate the direction of the satellite 20 during the transfer phase in order to ensure in particular that the estimated direction is compatible with the intended trajectory of said satellite 20. Should it prove necessary to decode the TT&C signal from the satellite (i.e. the telemetry signal), the latter could be decoded based on the signals received on the array antenna 30 if the duration of the data symbols of the TT&C signal is equal to or greater than the duration of the acquisition intervals. Failing this, the monitoring system 10 can also comprise, in addition to the array antenna 30, a receive antenna, called the "directional antenna" 33, the maximum gain of which is greater than the respective maximum gains of each of the elementary antennas 31 of the array antenna 30. Once the satellite 20 has been detected and its direction estimated using the array antenna 30, it is therefore possible to direct the directional antenna 33 in the estimated direction of the satellite 20 to decode the TT&C signal transmitted by said satellite 20 and to verify that it is functioning correctly.

The directional antenna may be an existing antenna of a TT&C station, for example.

Figure 5:
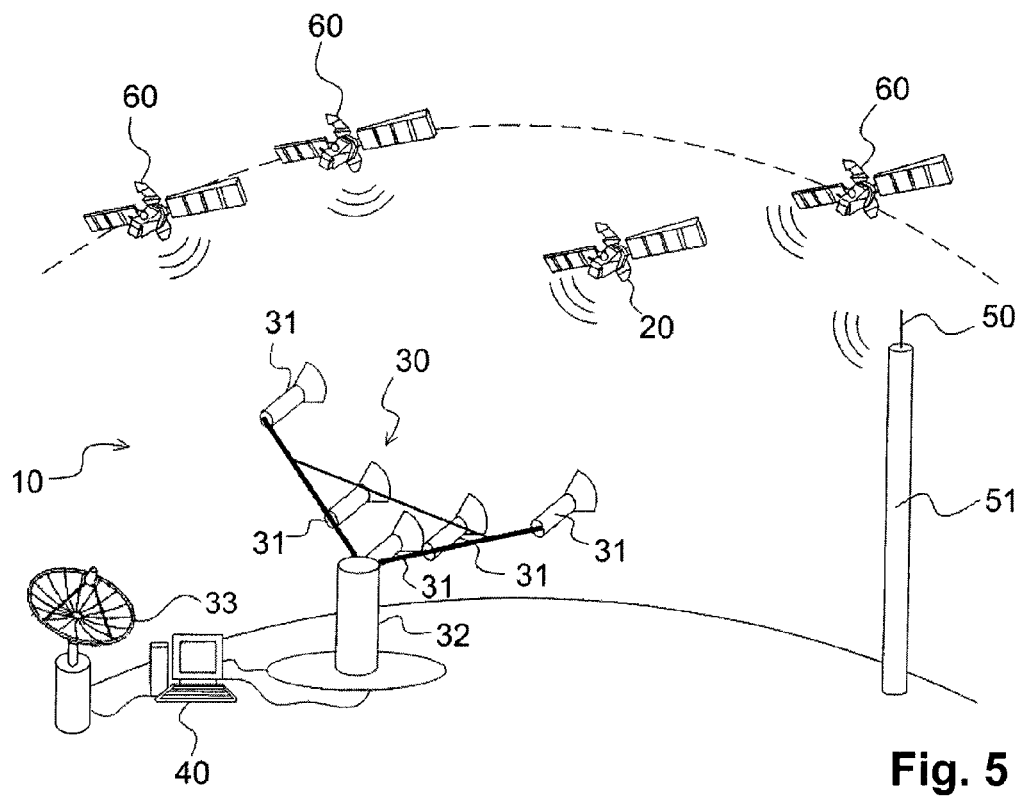
FIG. 5: a diagrammatic representation of a preferred embodiment of a monitoring system.

In preferred embodiments, and as shown by FIG. 5, the directional antenna 33 is a dedicated antenna (i.e. not also belonging to a TT&C station) of the monitoring system 10, colocated with the array antenna 30. In such a monitoring system 10, the directional antenna 33 may be used for example to improve the resolving of ambiguity in the estimate of the direction of the satellite 20. In effect, in the situation where, at a given time, several positions are possible for the satellite 20 based on the signals received on the elementary antennas 31 of the array antenna 30, it will then be possible to resolve the ambiguity by directing the directional antenna 33 in the direction of each of the possible positions, to determine which of those positions corresponds to the real position of said satellite 20. Compared to a prior art monitoring system that would not comprise a directional antenna, it is possible with a monitoring system 10 in accordance with the invention, thanks to the array antenna 30, to reduce the number of directions in which said directional antenna 33 must be directed. Moreover, in contrast to the antennas of TT&C stations, the directional antenna 33 does not have to transmit TT&C signals (control signals) in the direction of the satellite 20, with the result that the directional antenna 33 can be more compact, more mobile and less directional than said TT&C station antennas. The width of the field of vision of the directional antenna 33 of the monitoring system 10 is preferably less than 5°, for example of the order of 1°.

In order to make it possible to attain a sufficient signal to noise ratio for the target signal, the phase instabilities introduced by the receive subsystems of the array antenna 30 must be limited throughout the acquisition intervals. For example, it is possible to choose components for the production of said receive subsystems that are sufficiently stable for the phase instabilities introduced to be negligible throughout the acquisition intervals.

In order to limit the constraints on the receive subsystems, in a preferred embodiment the monitoring system 10 comprises a reference calibration transmitter 50, immobile relative to the array antenna, adapted to transmit a reference calibration signal to the array antenna 30. The monitoring method 70 then comprises, for each pair of elementary antennas 31 considered for estimating the direction of the satellite:

the measurement of a phase difference, called the "calibration phase difference", between the signals corresponding to the reference calibration signal received on the pair of elementary antennas 31 concerned, the compensation of the variations of the calibration phase difference measurements for the pair of elementary antennas 31 concerned on the useful phase difference measurements.

The reference calibration transmitter 50 being immobile relative to the array antenna 30, the calibration phase difference variations will primarily be caused by the phase instabilities of the respective receive subsystems of the elementary antennas 31. These phase instabilities, introduced by said receive subsystems, are independent of the path difference of the target signal. The calibration phase difference variations therefore constitute an estimate of the phase instabilities of said receive subsystems and can be used to compensate these phase instabilities on the useful phase difference measurements.

In the nonlimiting example illustrated by FIGS. 1 and 5, the reference calibration transmitter 50 is a ground transmitter located in the far field relative to the array antenna 30. The reference calibration transmitter 50 is arranged at the top of a pylon 51, for example, in the field of vision of said array antenna 30. In alternative embodiments, the reference calibration transmitter 50 is onboard a satellite in geostationary orbit in the field of vision of the array antenna 30.

Figure 6:
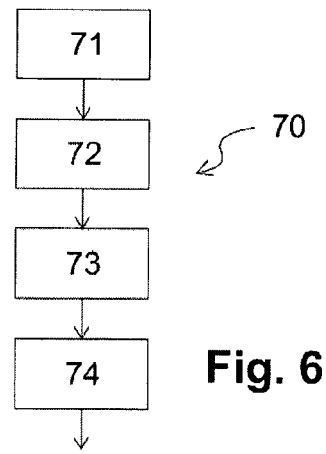
FIG. 6: a diagram representing steps of a monitoring method in accordance with one embodiment.

FIG. 6 represents the main steps of a monitoring method 70 in accordance with the invention in the case of a monitoring system 10 comprising a reference calibration transmitter 50 for measuring the useful phase difference for a pair of elementary antennas 31. As shown by FIG. 6, these main steps are as follows:

71 acquisition of the signals received on the elementary antennas 31 of the pair concerned over an acquisition interval of duration $\Delta T$, 72 measurement of the calibration phase difference between the signals acquired during the acquisition interval for the pair of elementary antennas 31 concerned, 73 compensation of the calibration phase difference measurement variations on the phases of the signals received on the pair of elementary antennas 31 concerned, 74 measurement of the useful phase difference for the pair of elementary antennas 31 concerned.

The steps illustrated by FIG. 6 are executed for each pair of elementary antennas 31 concerned. The monitoring method 70 then comprises a step (not shown in the figures) of estimating the direction of the satellite 20 based on the useful phase difference measurements obtained for the various pairs of elementary antennas 31 concerned.

Once the direction of the satellite 20 has been estimated, the monitoring method 70 also comprises other steps (not shown in the figures) that depend on the monitoring strategy adopted. For example, the estimated direction (possibly complemented by an estimate of the altitude of the satellite 20) can be compared to the intended direction of the satellite 20, given the intended trajectory during the transfer phase. In the event of a large difference between the estimated direction and the intended direction, a directional antenna 33 can then be directed toward the satellite 20 in order to decode the TT&C signal transmitted and to determine the cause of this difference, etc.

Simultaneously with the acquisition step 71, the reference calibration transmitter 50 transmits the reference calibration signal recurrently or continuously throughout the acquisition interval.

The reference calibration signal can take various appropriate forms to make it possible to compensate the phase instabilities of the receive subsystems of the elementary antennas 31.

In accordance with a first example, the reference calibration signal is a substantially sinusoidal signal (also known as a continuous wave (CW) signal). Such a reference calibration signal has the advantage of being simple to generate. Moreover, such a calibration signal is simple to use in that it occupies a narrow frequency band the center of frequency of which can be chosen to be very close to the frequency band occupied by the target signal.

In accordance with another nonlimiting example, the reference calibration signal is a spread spectrum type signal, for example a carrier frequency modulated by a predefined spectrum spreading code having good autocorrelation properties, such as a pseudo-random noise (PN) sequence, Gold sequence, etc. Because of the spectrum spreading, the spectral power density of the calibration signal can be made arbitrarily low, the correlation by the spectrum spreading code introducing a processing gain increasing in proportion to the length of the spectrum spreading code.

In a preferred embodiment, the calibration phase difference measurement step 72 comprises:
  either the correlation of the signals received on said pair of elementary antennas with the reference calibration signal transmitted, for example a correlation with the predefined spectrum spreading code in the case of a spread spectrum signal,
  or the analysis of said received signals by means of an FFT or a PLL, for example in the case of a CW signal.

The calibration phase difference is then computed as the difference between the phases of the signals obtained by correlation or after analysis by means of an FFT or a PLL.

It should be noted that the correlation of the signals received by the reference calibration signal actually transmitted, or the analysis thereof by means of an FFT or a PLL, introduces a processing improvement that leads to an improvement in the signal to noise ratio for the calibration phase difference measurements. In effect, the thermal noise is averaged over the duration of a sliding window (for example the duration of the reference calibration signal), with the result that its power is reduced. Moreover the power of other signals, different from the reference calibration signal, such as the target signal, is also reduced.

Because of this processing improvement, the reference calibration signal can furthermore be transmitted at a reduced power, which makes it possible to limit the interference induced in the target signal in particular, which is advantageous in that the reference calibration signal is preferably transmitted at the same time as the target signal and has a frequency close to the frequency of the latter.

A plurality of calibration phase difference measurements are preferably effected on the signal acquired during the acquisition interval, at different times of said acquisition interval, in order to be able to compensate optimally the phase instabilities of the receive subsystems. The calibration phase difference measurements and compensations may be effected at each moment of the acquisition interval, for example, sample by sample.

In particular embodiments, it is equally possible to transmit reference calibration signals at different frequencies within an acquisition frequency band $\Delta F$ of the target signal. In effect, if the acquisition band $\Delta F$ is wide, the phase instabilities introduced by the receive subsystems could vary significantly with the frequency concerned inside said acquisition band $\Delta F$. The transmission of reference calibration signals at different frequencies in said acquisition band $\Delta F$ makes it possible to compensate optimally the phase instabilities of the receive subsystems. In practice, it may prove sufficient to transmit a first reference calibration signal in the vicinity of a lower bound of the acquisition band $\Delta F$ and a second reference calibration signal in the vicinity of an upper bound of said acquisition band $\Delta F$. Two calibration phase difference measurements are therefore effected at the level of the upper and lower bounds of the acquisition band $\Delta F$ and measurements for intermediate frequencies can be obtained by interpolation.

The calibration phase difference measurements are then used during the compensation step 73 to correct the acquired signals corresponding to the target signal transmitted by the satellite 20. This compensation is carried out in the conventional way.

It should be noted that it is equally possible to compensate effects other than the phase and/or frequency instabilities. In particular, the satellite 20 being moving in the direction of the GEO orbit, the associated Doppler effect may become non-negligible, in particular if the duration $\Delta T$ of the acquisition interval is long. In such a situation, it is possible to estimate the frequency variations induced by the Doppler effect using means considered to be known by the person skilled in the art and to compensate them on the acquired signals corresponding to the target signal transmitted by the satellite 20.

The useful phase difference measurement is then determined, during the step 74, based on the signals obtained after compensation for the pair of elementary antennas 31 concerned. Said step 74 preferably comprises the computation of the correlation of said signals with one another throughout the duration $\Delta T$ of the acquisition interval and the useful phase difference measurement is determined as being the phase of the result of said correlation computation.

When the acquisition band $\Delta F$ is wide compared to the frequency band occupied by the target signal, the useful phase difference measurement step 74 advantageously comprises filtering the signals obtained after compensation by a filter adapted to attenuate the frequency components outside the frequency band occupied by the target signal. As a result, the signal to noise ratio of the target signal is improved, all the more so if the frequency band occupied by the target signal is narrow (for example if the target signal is a CW signal).

In preferred embodiments, considered separately or in combination with the embodiments described above, the calibration method 70 comprises a geometric calibration step (not shown in the figures) of the array antenna 30. During this step, the geometry of the array antenna 30 is estimated based on:
  measurements of the phase difference between signals corresponding to geometric calibration signals transmitted by geometric calibration transmitters 60,
  the positions of said geometric calibration transmitters and the position of the array antenna 30.

By "geometry of the array antenna" is meant at least the attitude of said array antenna 30, i.e. the global direction in which said array antenna 30 points. In effect, the array antenna 30 as shown in FIG. 1 is oriented by an operator in an approximate direction with an accuracy that is generally of the order of a few degrees, which does not make it possible to achieve sufficient accuracy to estimate the direction of the satellite 20 (the required accuracy generally being of the order of a few tens of millidegrees). In effect, the useful phase difference measurements make it possible to estimate the direction of the satellite 20 relative to the array antenna 30. Now, it is desirable to obtain an estimate of the absolute direction of the satellite 20, for example expressed in the terrestrial frame of reference, which necessitates a knowledge of the attitude of the array antenna 30 in said terrestrial frame of reference. If the accuracy of the estimate of the attitude is low, then the accuracy of the estimate of the absolute direction will be low whatever the accuracy of the estimate of the direction of the satellite 20 relative to the array antenna.

The positions of the geometric calibration transmitters 60 being known, just like the position of the array antenna 30, it is possible to estimate the absolute directions of the geometric calibration transmitters 60 in the terrestrial frame of reference. The phase difference measurements for said geometric calibration signals make it possible to estimate the directions of said geometric calibration transmitters 60 relative to the array antenna 30. By comparing the estimated relative directions to the estimated absolute directions, it is possible to estimate the attitude of the array antenna 30 using means considered to be evident to the person skilled in the art.

As shown by FIG. 1, some or all of the geometric calibration transmitters 60 may be transmitters onboard satellites in geostationary orbit and/or non-geostationary (LEO, MEO) orbit, for example satellites of a satellite navigation system (GPS, Glonass, Beidou, Galileo, etc.).

The accuracy of the estimate of the attitude of the array antenna 30 will increase as the number of geometric calibration transmitters 60 increases and if they are distributed throughout the field of vision of the array antenna 30. In the situation where all the geometric calibration transmitters 60 are onboard satellites in geostationary orbit, situated on the geostationary arc, the accuracy could therefore be limited by the fact that they would then be insufficiently distributed in the field of vision of the array antenna 30. It may then prove advantageous to consider also, for example, geometric calibration transmitters 60 onboard satellites in non-geostationary orbit. Furthermore, in accordance with other examples, there is nothing to rule out having geometric calibration transmitters 60 on the ground.

Similarly, it is equally possible to estimate during the geometric calibration phase, in addition to the attitude of the array antenna 30, the respective positions of the elementary antennas 31 relative to one another and/or the respective attitudes of said elementary antennas 31.

In order to obtain an optimum accuracy for estimating the direction of the satellite 20, it is advantageous to execute the geometric calibration step immediately before or simultaneously with the useful phase difference measurement step 74. For example, the geometric calibration step is preferably executed immediately before the step 71 of acquiring the signals corresponding to the target signal and/or on said acquired signals when the acquisition band ΔF makes it possible to acquire both said target signal and some or all of the geometric calibration signals.

In particular, if the geometric calibration signals are widely spaced in frequency (for example so as to be able to use a large number of geometric calibration transmitters 60) and/or very widely spaced in frequency from the target signal relative to the width of the acquisition band ΔF, it is necessary to acquire said geometric calibration signals and the target signal sequentially, during distinct acquisition intervals. Where appropriate, the reference calibration transmitter 50 is preferably adapted to change the frequency of the reference calibration signal and the monitoring method 70 comprises, for each acquisition, a step of commanding the reference calibration transmitter 50 to transpose the frequency of the reference calibration signal into the acquisition band of the signal to be acquired. As a result, the phase and/or frequency instabilities can be corrected accurately on all the acquired signals.

If the geometric calibration transmitters 60 were to transmit respective geometric calibration signals at closely spaced frequencies, it may prove complex to distinguish said geometric calibration transmitters 60 by means of the array antenna 30. For example, this may notably be the case if the calibration transmitters 60 are onboard satellites in geostationary orbit and if the geometric calibration signals are telemetry signals transmitted by said satellites. In effect, given the width of the field of vision of the array antenna 30, up to four or more telemetry signals may in practice be found over a frequency range of a few kHz. In order to distinguish the geometric calibration transmitters 60, i.e. to determine the exact frequency of the geometric calibration signal transmitted by each geometric calibration transmitter 60, it is possible to use a directional antenna 33 as described in particular with reference to FIG. 5. In effect, it is possible, if necessary, to direct the directional antenna 33 in the direction of each geometric calibration transmitter 60 and thus to determine the exact frequency of the geometric calibration signal that it is transmitting and therefore to separate it from the signals that are close to it in frequency.

More generally, it should be noted that the embodiments considered above have been described by way of nonlimiting example and that other variants may therefore be envisaged.

In particular, the invention has been described considering a single array antenna. In accordance with other examples, the monitoring system 10 comprises a plurality of array antennas, preferably distributed on the Earth's surface so that their respective fields of vision are complementary. For example, a set of six to eight array antennas geographically distributed around the Earth makes it possible to ensure sufficient observability of the orbit of the satellite during the transfer phase. It is equally possible to have a plurality of colocated array antennas. In accordance with a preferred embodiment, the monitoring system 10 may comprise two or three colocated array antennas. These colocated array antennas are preferably arranged so that their respective fields of vision do not overlap or at most partially overlap, each of these array antennas being adapted to cover a field of vision preferably 40° wide or wider (for example of the order of 50° wide).

Moreover, the invention has been described considering the situation in which the mission orbit is a GEO orbit and the initial orbit is a GTO orbit. The invention is nevertheless applicable to other types of mission orbit and to other types of initial orbit when the satellite is transferred from an initial orbit to a mission orbit distinct from the initial orbit. In particular, the mission orbit may be any type of geosynchronous orbit. The initial orbit may be any type of GTO orbit with or without inclination, or a super-synchronous orbit, a sub-synchronous orbit, etc.

The foregoing description shows clearly that by virtue of its various features and their advantages the present invention achieves the objectives that were set for it. In particular, the monitoring system 10 in accordance with the invention makes it possible to monitor at lower cost the phase of transferring a satellite from a GTO orbit to the GEO orbit, or even to monitor simultaneously a plurality of satellites in a transfer phase, without having to depoint the array antenna.

The invention claimed is:

1. A method for monitoring a transfer phase wherein a satellite transfers from an initial Earth orbit to a mission Earth orbit different from said initial Earth orbit using electric propulsion, comprising:

using a ground array antenna, the ground array antenna comprising a plurality of elementary antennas, said elementary antennas arranged such to be non-coplanar with each other, and each elementary antenna having a main radiation lobe with a width greater than or equal to 20° to estimate a direction of said satellite during said transfer phase, said elementary antennas being oriented such that respective fields of vision of each one of the plurality of elementary antennas overlap,
wherein the estimating of the direction of said satellite includes the steps of
receiving, on a pair of said elementary antennas, signals corresponding to a target signal transmitted by the satellite during the transfer phase, and
performing, via a processor device in communication with said ground array antenna, at least one measurement of a useful phase difference between the received signals corresponding to the target signal.

2. The method as claimed in claim 1, wherein a directional antenna, having a maximum gain greater than the respective maximum gains of each of the elementary antennas of the array antenna, is directed in the direction of the satellite, estimated via the array antenna, to receive the target signal transmitted by said satellite.

3. The method as claimed in claim 2, wherein, in the event that a plurality of possible directions of the satellite are estimated via the array antenna, the directional antenna is directed in each possible direction to determine the real direction of said satellite.

4. The method as claimed in claim 1, further comprising:
transmission, by a reference calibration transmitter immobile relative to the array antenna, of a predetermined reference calibration signal to the array antenna,
measurement of a calibration phase difference between signals corresponding to the transmitted reference calibration signal received on the pair of elementary antennas,
using the measured phase difference to correct acquired signals corresponding to the target signal transmitted by the satellite.

5. The method as claimed in claim 4, wherein the calibration phase difference measurement for the pair of elementary antennas comprises either i) a correlation of received reference calibration signals received on said pair of elementary antennas with the predefined reference calibration signal, or ii) an analysis of said received reference calibration signals via an FFT or a PLL.

6. The method as claimed in claim 4, wherein the reference calibration signal is transmitted during an interval of acquisition of the signals corresponding to the target signal received on the pair of elementary antennas, and in that the measurement of the useful phase difference for said pair of elementary antennas comprises a correlation of said acquired signals with one another throughout the acquisition interval, a plurality of calibration phase difference measurements being effected, during said acquisition interval, to compensate the variations of the calibration phase difference measurements on the acquired signals.

7. The method as claimed in claim 4, further comprising:
geometric calibration of the array antenna, during which a geometry of the array antenna is estimated based on measurements of the phase difference between signals corresponding to geometric calibration signals transmitted by geometric calibration transmitters and received on the array antenna, and based on the positions of said geometric calibration transmitters and the position of the array antenna.

8. The method as claimed in claim 7, wherein the signals corresponding to some or all of the geometric calibration signals received on the array antenna are acquired sequentially during distinct acquisition intervals, said method comprising, for the acquisition of a geometric calibration signal, a step of commanding the reference calibration transmitter to transpose the frequency of the reference calibration signal into a frequency band for acquisition of said geometric calibration signal, the variations of the calibration phase difference measurements being compensated on the measurements of the phase difference between said signals corresponding to said geometric calibration signal.

9. A system for monitoring a phase wherein a satellite transfers from an initial Earth orbit to a mission Earth orbit different from said initial Earth orbit using electric propulsion, comprising:
a ground array antenna that includes a plurality of elementary antennas, said elementary antennas arranged such to be non-coplanar with each other, and each of said elementary antennas having a main radiation lobe with a width greater than or equal to 20°, said elementary antennas being oriented so that respective fields of vision of each one of the plurality of elementary antennas overlap; and
a processor device, in communication with said ground array antenna, that estimates a direction of the satellite during said transfer phase based on at least one measurement of a useful phase difference between signals corresponding to a target signal, transmitted by said satellite during the transfer phase, and received on a pair of said elementary antennas of the array antenna.

10. The system as claimed in claim 9, further comprising:
a directional antenna having a maximum gain greater than respective maximum gains of each of the elementary antennas of the array antenna.

11. The system as claimed in claim 9, wherein the elementary antennas of the array antenna are joined together and attached to a same support structure.

12. The system as claimed in claim 9, wherein a maximum distance between elementary antennas of the array antenna is equal to or less than $50 \cdot \lambda_{MAX}$, $\lambda_{MAX}$ corresponds to a maximum wavelength of the signals to be acquired via said array antenna.

13. The system as claimed in claim 9, wherein a minimum distance between elementary antennas of the array antenna is equal to or greater than $5 \cdot \lambda_{MAX}$, where $\lambda_{MAX}$ corresponds to a maximum wavelength of the signals to be acquired via said array antenna.

14. The system as claimed in claim 9, further comprising:
a reference calibration transmitter immobile relative to the array antenna, said reference calibration transmitter being adapted to transmit a predetermined reference calibration signal to the array antenna,
wherein the processor device is further configured to measure a calibration phase difference between signals corresponding to the transmitted reference calibration signal received on the pair of elementary antennas; and
wherein the processor device is further configured to use the measured phase difference to correct acquired signals corresponding to the target signal transmitted by the satellite.

15. The system as claimed in claim 14, wherein the processor device is further configured to command the reference calibration transmitter to transpose the frequency of the reference calibration signal.

16. The system as claimed in claim 14, wherein the processor device is configured to effect either i) a correlation of received reference calibration signals received on said pair of elementary antennas with the predefined reference calibration signal, or ii) an analysis of said received reference calibration signals by means of an FFT or a PLL.

17. The system as claimed in claim 14, wherein reference calibration transmitter is a ground transmitter or a transmitter onboard a satellite in geostationary orbit.

18. The system as claimed in claim 9, wherein the processor device is further configured to calibrate the array antenna geometrically based on measurements of the phase difference between signals corresponding to geometric calibration signals transmitted by geometric calibration transmitters and received on the array antenna and based on the positions of said geometric calibration transmitters and the position of the array antenna.

19. The system as claimed in claim 18, wherein at least one geometric calibration transmitter is a transmitter onboard a satellite in geostationary orbit or a satellite in non-geostationary orbit.

* * * * *